Dec. 20, 1949     I. E. BOEKENOOGEN ET AL     2,491,846
LEG STRUCTURE FOR FISH LURES
Filed Aug. 28, 1946
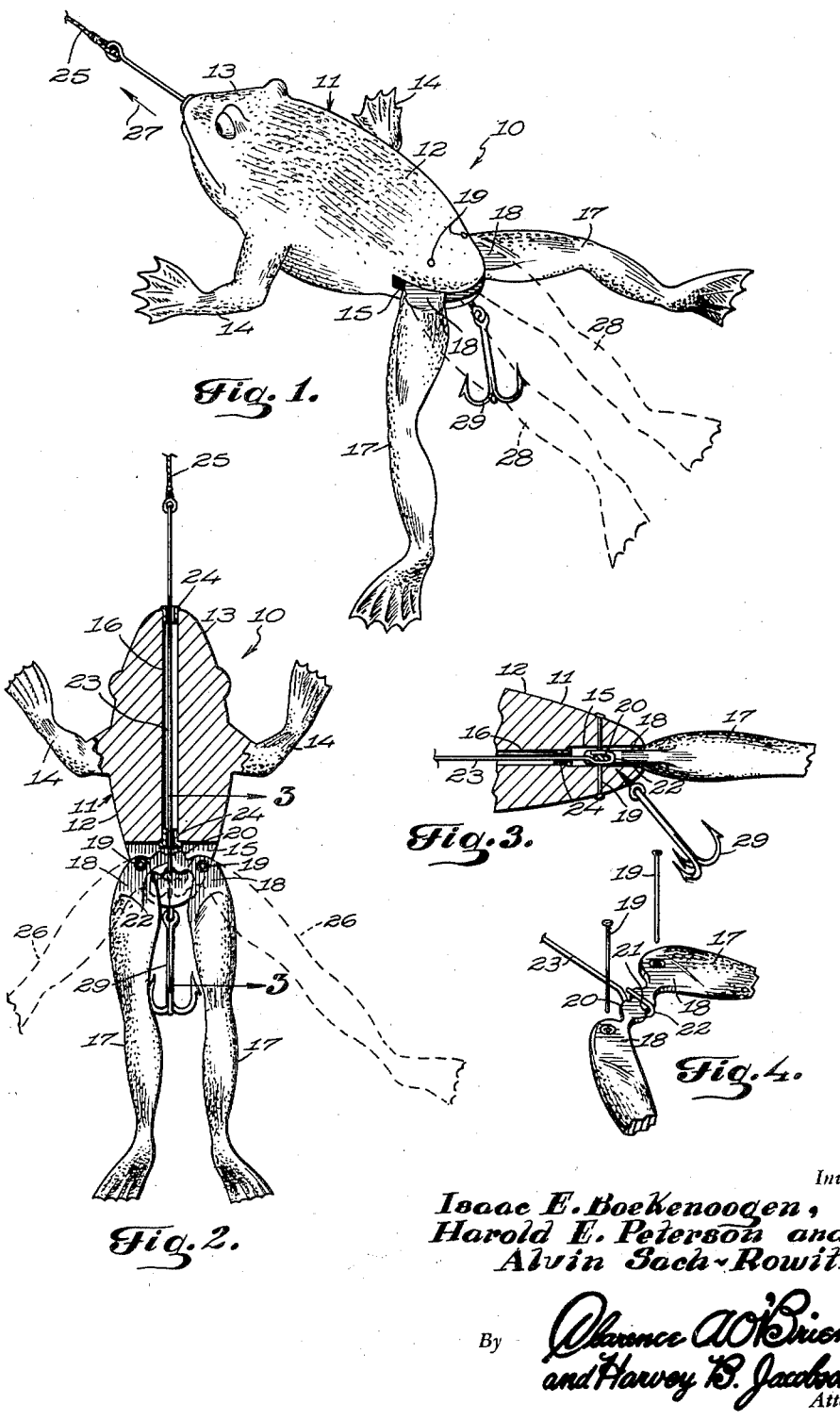
Inventors
Isaac E. Boekenoogen,
Harold E. Peterson and
Alvin Sach-Rowitz
By Clarence A. O'Brien
and Harvey B. Jacobson
Attorneys Patented Dec. 20, 1949

2,491,846

UNITED STATES PATENT OFFICE 2,491,846

LEG STRUCTURE FOR FISH LURES

Isaac E. Boekenoogen, Harold E. Peterson, and Alvin Sach-Rowitz, Moose Lake, Minn.

Application August 28, 1946, Serial No. 693,528

1 Claim. (Cl. 43—42.3)

This invention relates to new and useful improvements and structural refinements in fish lures, and the principal object of the invention is to provide a device of the character herein described, which simulates the appearance of a frog and which is capable of realistic movement when the line to which it is attached is smartly pulled or jerked.

A further object of the invention is to provide a fish lure which may be effectively employed for all types of fishing.

Another object of the invention is to provide a fish lure which is simple in construction and which will not easily become damaged.

An additional object of the invention is to provide a fish lure which will readily lend itself to economical manufacture and which is otherwise well adapted for the purpose for which it is intended.

With the above more important objects in view, and such other objects as may become apparent as this specification proceeds, the invention consists essentially of the arrangement and construction of parts as illustrated in the accompanying drawings, in which:

Figure 1 is a perspective view of the invention;

Figure 2 is a plan view thereof with the body portion in horizontal section;

Figure 3 is a cross-sectional view, taken substantially in the plane of the line 3—3 in Figure 2, and Figure 4 is a fragmentary, perspective detail, illustrating the attachment of the legs.

Like characters of reference are used to designate like parts in the specification and throughout the several views.

Referring now to the accompanying drawings in detail, the invention consists of a fish lure designated generally by the reference character 10, the same embodying in its construction a body formed from any suitable material and resembling the appearance of a frog. This body is designated by the reference character 11 and includes what may be referred to as the body portion per se 12, formed integrally with a head 13 and with a pair of immovable forelegs 14.

The rear end of the body portion 12 is formed with a transversely extending slot or recess 15 and a bore 16 extends longitudinally of the portion 12 and the head 13, as will be clearly apparent from the accompanying drawings. It will be noted that one end of the bore 16 opens at the mouth of the frog, while the remaining end of the bore communicates with the slot or recess 15.

A pair of rear legs 17 are provided with flattened end portions 18 which extend into the slot 15 and are pivotally connected to the body portion 12 by means of suitable pins 19.

The legs 17 are preferably formed from resilient material such as rubber and a resilient intermediate portion 20 connects the two legs adjacent the pivots thereof, as is best shown in Figure 4.

The portion 20 is formed with suitable notches 21, these forming a seat, so to speak, for a hook-like portion 22 of an actuating rod 23. This rod is slidably positioned in suitable bushings 24 provided in the aforementioned bore 16 and the remaining end of the rod projects forwardly from the mouth of the frog and is connected in any suitable manner to a conventional fishing line 25.

When the invention is placed in use, the normal configuration of the leg connecting portion 20 is such as to retain the legs 17 in the position illustrated by full lines in Figure 1 and by phantom lines 26 in Figure 2. It will be found that by smartly pulling or jerking the line 25 as to slide the rod 23 in the direction of the arrow 27, the legs 17 will be brought together as indicated by the phantom lines 28 in Figure 1 and by the full lines in Figure 2. As soon as tension upon the line 25 is released, the inherent resiliency of the portion 20 will, of course, return the legs to their original position and it will be observed that in this manner, the lure will exhibit life-like motion as well as realistic appearance.

It should be understood that the legs 17 may be formed integrally with the portion 20, substantially as shown. A fish hook 29 of conventional design may, of course, be attached to the body portion 12, the number and exact location of the hooks being governed by the particular working conditions.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What we claim as our invention is:

In a fish lure, the combination of a body, a leg actuating rod slidable in said body and provided at one end thereof with a hook-like connecting element, and a leg-structure formed integrally from resilient material and comprising a pair of spaced legs having inner end portions thereof pivoted to said body and a transverse web connecting said legs together, said web having a relatively wide intermediate portion and relatively narrow side portions connected to inner end portions of said legs, said hooklike element being connected to the intermediate portion of said web and the side portions of the web being of such size as to permit said legs to swing toward and away from each other in response to sliding of said rod.

ISAAC E. BOEKENOOGEN.
HAROLD E. PETERSON.
ALVIN SACH-ROWITZ.

REFERENCES CITED

The following references are of record in the file of this patent:

UNITED STATES PATENTS

| Number | Name | Date |
|--------|------|------|
| 534,506 | Hastings | Feb. 19, 1895 |
| 803,134 | Rhodes | Oct. 31, 1905 |
| 882,344 | Rhodes | Mar. 17, 1908 |
| 1,986,991 | Wilson | Jan. 8, 1935 |